(12) United States Patent
Nayar et al.

(10) Patent No.: US 9,104,746 B1
(45) Date of Patent: Aug. 11, 2015

(54) IDENTIFYING CONTRARIAN TERMS BASED ON WEBSITE CONTENT

(71) Applicant: Google Inc., Mountain View, CA (US)

(72) Inventors: Raveesh Nayar, Ahmedabad (IN); Mayur Datar, Pune (IN); Sumit Sanghai, Bangalore (IN); Pranav Kumar Tiwari, Bangalore (IN)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 14/229,122

(22) Filed: Mar. 28, 2014

Related U.S. Application Data

(63) Continuation of application No. 13/485,337, filed on May 31, 2012, now Pat. No. 8,688,697.

(51) Int. Cl.
*G06F 17/00* (2006.01)
*G06F 17/30* (2006.01)

(52) U.S. Cl.
CPC ...... *G06F 17/30598* (2013.01); *G06F 17/3053* (2013.01)

(58) Field of Classification Search
CPC .......... G06F 17/3053; G06F 17/30867; G06F 17/30864; G06F 17/30554; G06F 17/30528
USPC ........................................................ 707/731
See application file for complete search history.

(56) References Cited

U.S. PATENT DOCUMENTS

| 2006/0095333 | A1 | 5/2006 | Gambhir |
| 2010/0161640 | A1 | 6/2010 | Gustafson et al. |
| 2012/0290910 | A1* | 11/2012 | Kumar et al. ................. 715/205 |

OTHER PUBLICATIONS

US Notice of Allowance on U.S. Appl. No. 13/485,337 Dtd Nov. 18, 2013, 9 pages.
US Office Action on U.S. Appl. No. 13/485,337 Dtd Jul. 19, 2013, 13 pages.

* cited by examiner

*Primary Examiner* — Truong Vo
(74) *Attorney, Agent, or Firm* — Foley and Lardner LLP; John D. Lanza

(57) ABSTRACT

A system and method for identifying contrarian terms is disclosed. The system and method includes identifying a plurality of websites describing a product or service, analyzing content in the plurality of websites, the content relating to the described product or service, identifying contrarian terms based on the website content using a processing circuit, wherein the contrarian terms comprise descriptions of a product or service, associating the identified contrarian terms with a category, within which the product or service has been categorized in at least one of the plurality of websites, and storing the contrarian terms and the associated category in a memory.

18 Claims, 6 Drawing Sheets

Find keywords based on one or more of the following:

Word or phrase [_____] — 604

Website [_____]

Category [_____] — 602

[Search]

Search terms (1) — 608

| | Keyword | Competition | Global Monthly Searches | Local Monthly Searches |
|---|---|---|---|---|
| ☐ | Men's shoes | High | 1,220,000 | 673,000 |
| ... | | | | |

Keyword ideas (100) — 606

| | Keyword | Competition | Global Monthly Searches | Local Monthly Searches |
|---|---|---|---|---|
| ☐ | Men's shoes | High | 1,220,000 | 673,000 |
| ☐ | Mens shoes | High | 1,500,000 | 823,000 |
| ☐ | Discount mens shoes | High | 9,900 | 6,600 |
| ... | | | | |

IDENTIFYING CONTRARIAN TERMS BASED ON WEBSITE CONTENT

RELATED APPLICATION

The present application claims priority to and is a continuation of U.S. Non-provisional application Ser. No. 13/485,337, entitled "Identifying Contrarian Terms Based on Website Content" and filed on May 31, 2012, which is incorporated herein by reference in its entirety for all purposes.

BACKGROUND

Users of a content management system, such as advertisers, select keywords to associate with content, such as advertisements. Content is displayed on a client device when terms corresponding to the keywords are entered into a search engine by a user of a client device or are associated with a website accessed by a user of a client device. Determining which keywords to select for a particular content account can be a lengthy and daunting process filled with uncertainty as to the effectiveness of selected keywords.

SUMMARY

One embodiment described herein relates to a method for identifying contrarian terms. The method includes identifying a plurality of websites describing a product or service, analyzing content in the plurality of websites, the content relating to the described product or service, and identifying contrarian terms based on the website content using a processing circuit, wherein the contrarian terms are descriptions of a product or service. Furthermore, the method includes associating the identified contrarian terms with a category, within which the product or service has been categorized in at least one of the plurality of websites and storing the contrarian terms and the associated category in a memory.

An additional embodiment described herein relates to a system for identifying contrarian terms. The system includes at least one processor configured to execute a computer program stored in at least one memory to identify a plurality of websites describing a product or service, analyze content in the plurality of websites, the content relating to the described product or service, identify contrarian terms based on website content wherein the contrarian terms comprise descriptions of a product or service, associate the identified contrarian terms with a category within which the product or service has been categorized in at least one of the plurality of websites, and store the contrarian terms and the associated category in memory.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings and the claims.

FIG. 6 is an example of a graphical user interface used to display key words according to one embodiment.

DETAILED DESCRIPTION OF ILLUSTRATIVE EMBODIMENTS

Figure 1:
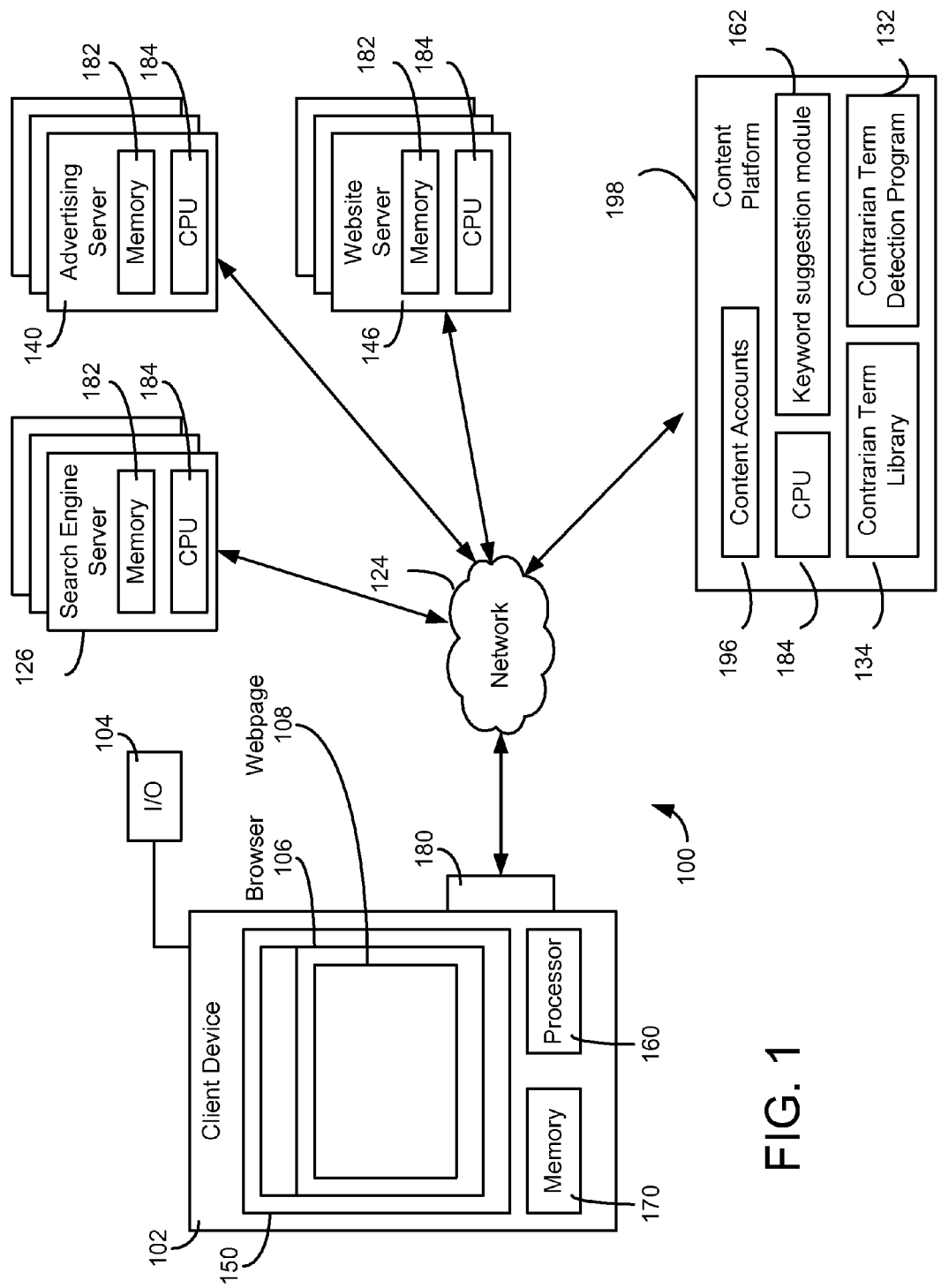
FIG. 1 is a schematic diagram of a network environment comprising a client-server architecture.

Before describing in detail the embodiments of the improved system and method, it should be observed that the invention includes, but is not limited to a novel structural combination of data processing components and communications networks. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the illustrative diagrams, but should be construed in accordance with the language in the claims.

Entities that sell products and services continually seek to improve the effectiveness of their online content. Content platforms facilitate selection of content such as advertisements for display on web pages such as search engine result web pages or other website web pages, for example. One way in which content may be selected for display is through keywords found in data associated with web pages or keywords entered into a search engine. According to one embodiment, a user of content platform 198, such as an advertiser, may select one or more keywords to associate with content such as an advertisement, for example. Subsequently, when a user navigates to a website associated with a keyword selected by the advertiser, the advertiser's content may be served and/or displayed to the user. Keywords selected by users such as advertisers may be stored in a content account along with various other user settings in a content platform. Content platforms may include content or advertising servers, content management systems, and the like. Once advertisers have selected a particular keyword, users who visit web pages that contain that particular keyword or who enter that particular keyword into a search engine may be shown content as determined by the advertiser who selected the particular keyword.

Referring to FIG. 1, a schematic diagram of a network environment 100 that includes a client-server architecture will be described. Network environment 100 allows for various content distribution processes described herein. Furthermore, network environment 100 enables various systems and methods described herein to identify, collect, store, and utilize contrarian terms to improve an advertisers ability to select relevant keywords for their content, such as an advertisement. Network element 124 may include a local area network (LAN), wide area network (WAN), a telephone network, such as the Public Switched Telephone Network (PSTN), a wireless link, an intranet, the internet, or combinations thereof. Client device 102 can include a processing circuit 160, a memory 170, a network interface 180, a user input element 104 as well as a display 150. Display 150 is in electronic communication with one or more processors that cause visual indicia to be provided on display 150. Display 150 may be located inside or outside of the housing of the one or more processors. For example, display 150 may be external to a desktop computer (e.g., display 150 may be a monitor), may be a television set, or may be any other stand-alone form of electronic display. In other examples, display 150 may be internal to a laptop computer, mobile device, or other computing device with an integrated display.

In general, a client device 102 may be any type of processor-based platform that is connected to a network 100 and that interacts with one or more applications. The display 150 includes a browser window 106 which is provided on display 150 as a result of running a browser software application on client device 102, such as the Google Chrome web browser. The browser window 106 displays content such as web pages from various websites to facilitate user interaction with the web pages. These websites may include websites selling products and/or services, for example. Websites that offer products and/or services may be identified by website source code such as HTML identifiers, for example. Furthermore, websites generally available to network 124 may include instructions in the form of computer code embodied in any suitable computer-programming language, such as, but not limited to, C, C++, C#, Go, Java, JavaScript, Perl, Python and Visual Basic. This computer code may be stored on a network accessible computing device such as a website server 146.

Website server 146 may provide a web page to client 102, in response to receiving a request for a web page from client 102. In some embodiments, computer code from content platform 198 previously inserted into a web page being requested by a client 102 will request content from a content or advertising server 140 to be displayed with the requested web page. Content platform 198 may similarly provide content for display with search engine results. Content platform 198 may select an advertisement to display to a client device 102, based on a search term entered into a search engine 126 by a client device 102. In addition, content platform 198 may select content to display to a client device 102, based on keywords associated with a web page requested by a client device 102. According to one embodiment, the content of a requested web page or search engine query may be parsed for keywords by performing character recognition or other word recognition function to recognize keywords. Once a keyword in web page content or a search engine query is identified, the keyword may be compared with the keywords selected in each content account 196, stored at content platform 198, according to one embodiment. If a keyword match is detected, the content platform 198 may select content, such as an advertisement associated with the keyword as determined by a particular user's content account. In addition to keyword matching, content platform 198 may take into consideration other factors to determine which content is selected such as bids from users, content quality, predicted click through rate of the content, etc.

Accordingly, users such as advertisers attempt to select keywords that are as closely related to their product or service as possible to reduce cost and to provide content to users for whom the content is the most relevant (e.g. users most likely to become customers). According to one embodiment, advertisers may interface with content platform 198 using a computing device 102 to access content accounts 196. Advertisers may upload content, set content settings, select keywords to associate with content, etc. within a content account 196. For example, if an advertiser sells digital cameras, they may select the keywords "digital camera" for their content account and associate the keywords "digital camera" with a content related to a digital camera containing a link to the advertiser's website. Subsequently, when a user enters the search term "digital camera" into a search engine 126, the content for a digital camera that the advertiser associated with the keywords "digital camera" may be displayed to that user in browser window 106. For example, if a client device 102 requests a web page 108 that is associated with the keywords "digital camera," content platform 198 may select content for a digital camera that an advertiser associated with the keywords "digital camera." The digital camera content may then be displayed to that user in a predetermined location of the webpage when it is displayed in browser window 106.

According to one embodiment, content platform 198 aids users such as advertisers in selecting keywords by suggesting keywords to the advertiser. According to one embodiment, keyword suggestions may be provided by a keyword suggestion module 162 stored in a memory of content platform 198. Graphical user interface 600, as shown in FIG. 6 shows one example of an interface for a keyword suggestion program. Advertisers may enter a word, phrase and/or category (e.g., at entry fields 602 and 604) related to their products and services into the keyword suggestion software and receive back a list of keyword suggestions 606. Each keyword suggestion in the list of keyword suggestions 606 may be a single keyword or multiple keywords. Once the keyword suggestions are displayed, the advertiser may select one or more keywords to add to their content account to be associated with particular content. The list of keyword suggestions may be ranked in order of relevance to the entered word or phrase, cost to select the keyword, popularity, effectiveness, etc., or a combination of multiple factors.

Another way to suggest keywords to a user such as an advertiser is based on using contrarian terms found on websites stored on website servers 146. Generally, contrarian terms are descriptions of a product or service that are mutually exclusive with respect to a particular category of product or service. Contrarian term descriptions may be a one word term or multiple word terms. For example, "men's jeans" and "women's jeans" may be contrarian term descriptions of a product within the category of apparel. According to one embodiment, these terms are considered mutually exclusive descriptions in that products offered on a website that are identified as men's jeans could not also be identified as women's jeans. According to one embodiment, terms such as "men's" and "women's" may be contrarian in particular categories such as jeans, but may not be contrarian in general. For example, the terms "men's" and "women's" may not be considered contrarian with respect to the category of laptop computers. Furthermore, terms may be deemed contrarian according to the processes described herein without being considered mutually exclusive in a grammatical or logical context. For example, if a large number of websites organize their website hierarchy such that "underwater" cameras and "child" cameras may be considered distinct products within the "camera" category, these terms may be considered contrarian despite the fact that a small number of websites may offer underwater child cameras.

According to various embodiments described herein, website hierarchies can be analyzed to identify and store these contrarian terms. Providing the stored contrarian terms to a keyword suggestion module 162 allows the program to provide a more accurate and tailored list of keyword suggestions to an advertiser. For example, when a word or phrase is entered by an advertiser into the keyword suggestion interface 600, the keyword suggestion software may compare the word or phrase with a list of keyword suggestions that are contrary to the entered word or phrase. According to one embodiment, all keyword suggestions that are contrary to the entered word or phrase may be demoted or removed from the list of keyword suggestions 606 provided to the advertiser so that the advertiser is less likely to select a keyword suggestion that is irrelevant to the advertiser's products and/or services.

Website hierarchies, website navigation paths, and web page computer code may all be used to determine which keywords found on a web page are considered contrarian. Website publishers use common techniques to display products and/or services on web pages so that users of the website can navigate to products and/or services in an intuitive and straight forward manner. For example, websites may organize products and services into a website hierarchy such that web pages on the lowest level of a website hierarchy, known as leaf pages (much like a leaf on a tree) are devoted to a product or service that is contrarian to a product or service found in other leaf pages. In addition, websites regularly organize products and services into lists such that products and services in the same list are contrarian to each other. For example, in many cases websites display a list of products or services related to a particular category. For example, a website may display a list of digital camera brands, each of which is mutually exclusive from the other because no two digital cameras can be made by two different brands of camera. These leaf pages and lists may be identified by various methods described in further detail below.

Figure 2:
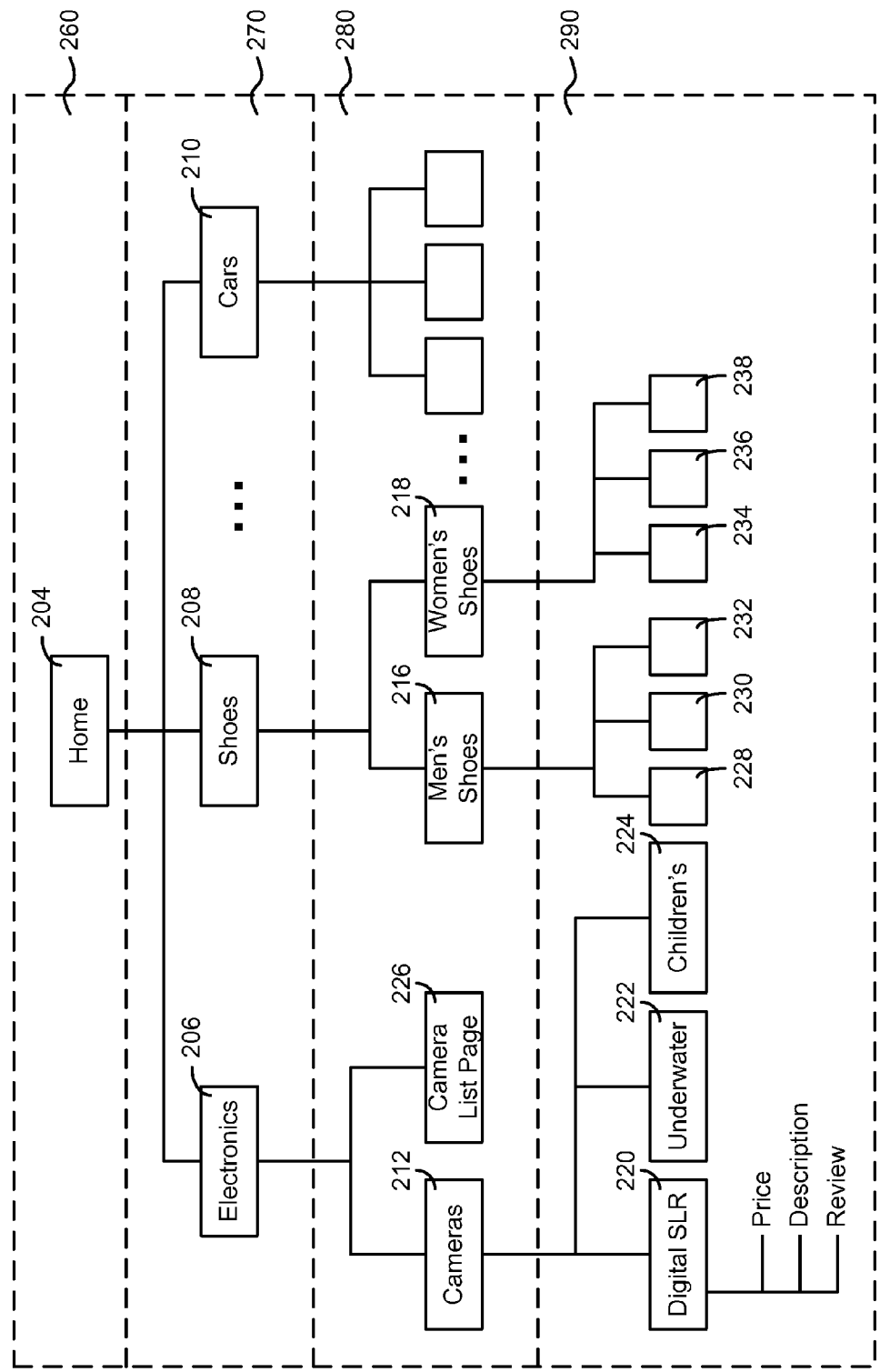
FIG. 2 is a schematic diagram of a website hierarchy accessible by a network.

One example of a website hierarchy 200 is shown in FIG. 2. The website hierarchy 200 is the framework by which the content of the website is presented. A website hierarchy 200 may predefine how users are able to navigate through a website. Each node 204, 206, 208, 210, 212, etc. in hierarchy 200 represents a web page containing content. The content may include information related to a product and/or service as well as one or more links to other web pages that a user may navigate to, as determined by the website hierarchy.

Figure 5:
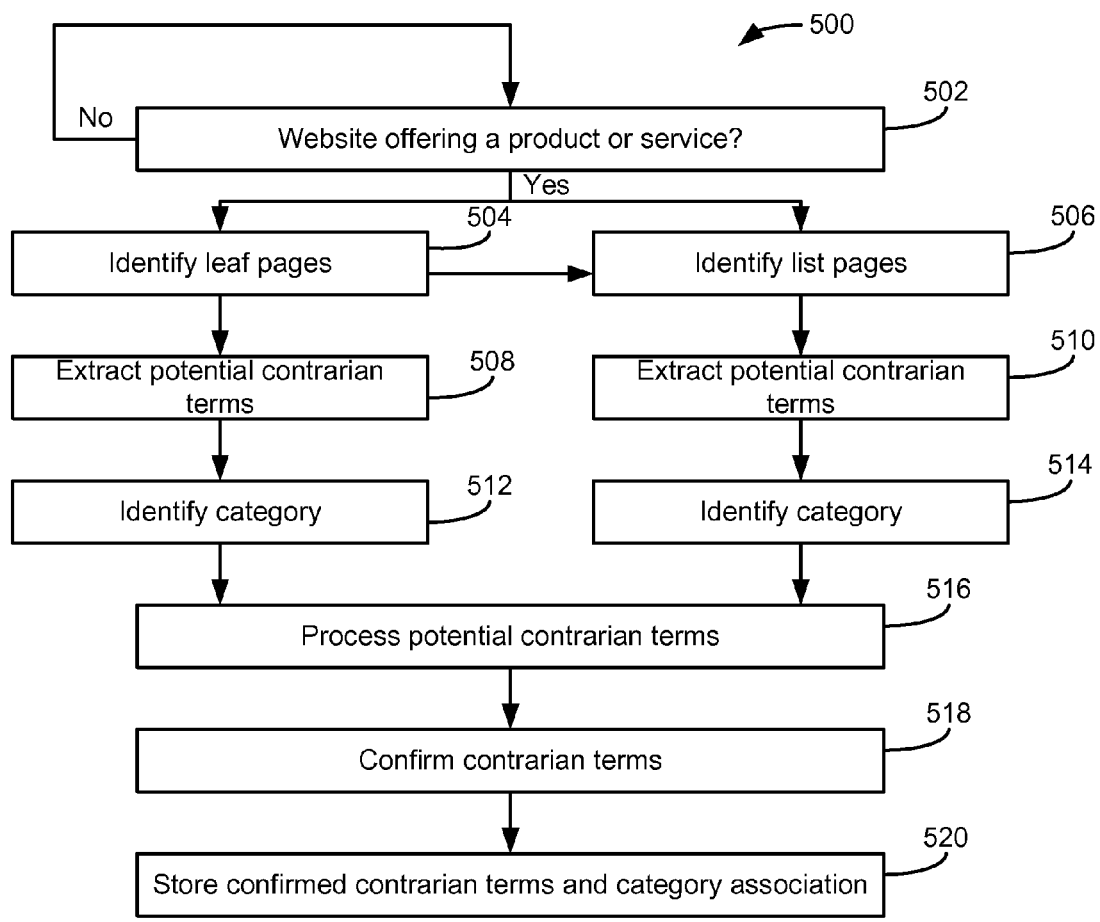
FIG. 5 is a flow chart of a process for detecting contrarian terms from website data according to one embodiment.

Website code stored on servers 140 or 146 may contain data that organizes websites in a hierarchy 200 as shown by elements in FIG. 2. This website code can be accessed by a contrarian term detection process stored in the memory of a computing device at content platform 198, such as memory module 132, to identify, confirm, retrieve, store, and/or utilize contrarian terms located in the website computer code, according to one embodiment. In general, detecting contrarian terms in a website hierarchy 200 may include using a computer code parser to identify leaf pages and product or service lists found in website hierarchy 200. The code parser may read computer code tags in web page content, URL addresses, or a website file directory, for example, to identify leaf pages and lists found in website hierarchy 200. One example of a contrarian term detection process 500 is shown in FIG. 5, described in further detail below. According to one embodiment, process 500 is an iterative process that is carried out for one website and is repeated for a series of websites such as a predetermined number of websites, for example. According to one embodiment, the same contrarian terms must be detected at a predetermined number of websites before being confirmed as contrarian terms that are used in keyword suggestion module 162.

Referring again to website hierarchy 200 as shown in FIG. 2, a tree structure 200 is shown which represents a data structure stored in a memory (such as a database, file system, read only memory, etc.). The data structure may be stored in memory 182 of one or multiple website servers 146. Nodes such as 206, 208, and 210 represent individual web pages which may be related to a product or service category, according to one embodiment. A node identifier, such as a computer code tag, may be stored in memory of a website server 146 for each node. The node identifier may include a textual description of the node, data indicating its relationship(s) to other nodes, etc. Nodes such as parent node 212 may have child nodes such as child nodes 220, 222, and 224. Parent nodes may be nodes that are one level above and connected in the same branch as another node, according to one embodiment. Child nodes may be nodes that are one level below a node and are connected in the same branch as that node, according to one embodiment. For example, node 206, representing a web page devoted to electronics is the parent node of child nodes 212 and 226 because it is in level 270, above level 280 and is connected in the same branch. Furthermore, node 212, devoted to cameras, is a parent node to child nodes 220, 222, and 224 because it is in level 280 above level 290 and is connected in the same branch. In many cases, website publishers design website hierarchies such that parent nodes may be a category of a product or service while child nodes may be sub-categories of the parent node category.

For example, with respect to the electronics web page 206 in level 270 of hierarchy 200, the category of electronics products is refined further in level 280 to describe a sub-category of electronics product in web page 212, cameras. Furthermore, in lower level 290, the sub-category of cameras is further refined into web pages devoted to different sub-categories of cameras including a "digital SLR" camera page 220, an "underwater" camera page 222, and a "children's" camera page 224. Because nodes 220, 222, and 224 do not have child nodes, the contrarian term detection program 132 may identify these nodes as leaf nodes, each containing a contrarian term with respect to one another. For example, because nodes 220, 222, and 224 may be all leaf nodes within the category of "cameras" as identified by parent node 212, keywords "Digital SLR," "underwater," and "Children's," may all be considered contrarian terms with respect to one another within the "cameras" category.

Figure 3:
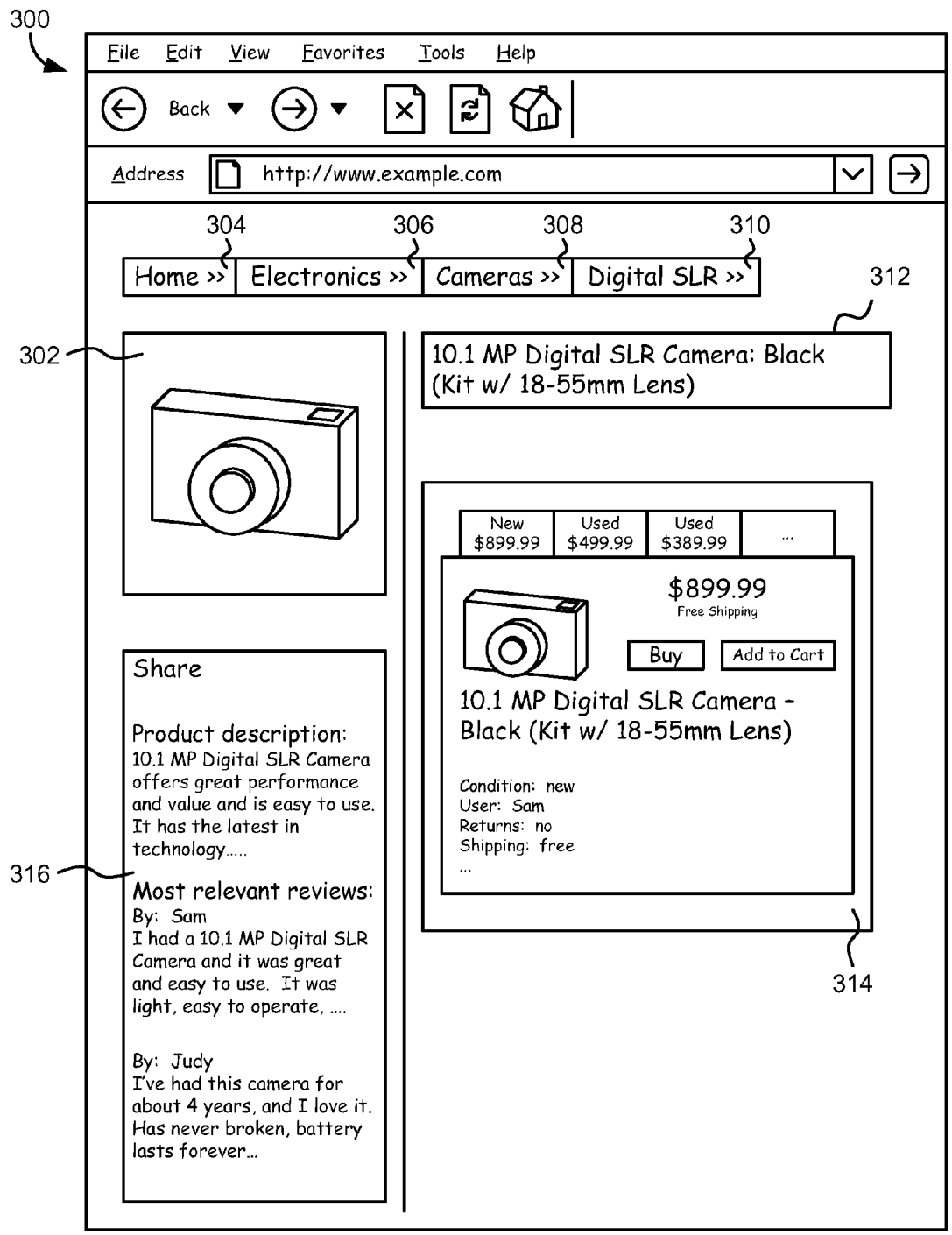
FIG. 3 is an example of a web page included in a website hierarchy according to one embodiment.

One example of a leaf page 300 is shown in FIG. 3. As shown in FIG. 3, a leaf page 300 may contain data related to a single product or service, such as a particular camera 302. Leaf pages, such as web page 300, may also contain an identifiable description of the product or service 312, product reviews 316 and data related to the product or service 314 including specification data and/or price data, for example. Contrarian terms in a given leaf page may be found in website computer code identifiers, such as HTML tags or JavaScript tags, for example. In general, computer code tags provide formatting or display instructions to website computer code. In some cases, products and/or services are formatted or displayed in predictable ways that can be detected by a website code parser or compiler. For example, products and/or services for sale may be identified by an HTML tag indicating the product and/or service is linked to a shopping cart capable of carrying out a financial transaction.

Figure 4:
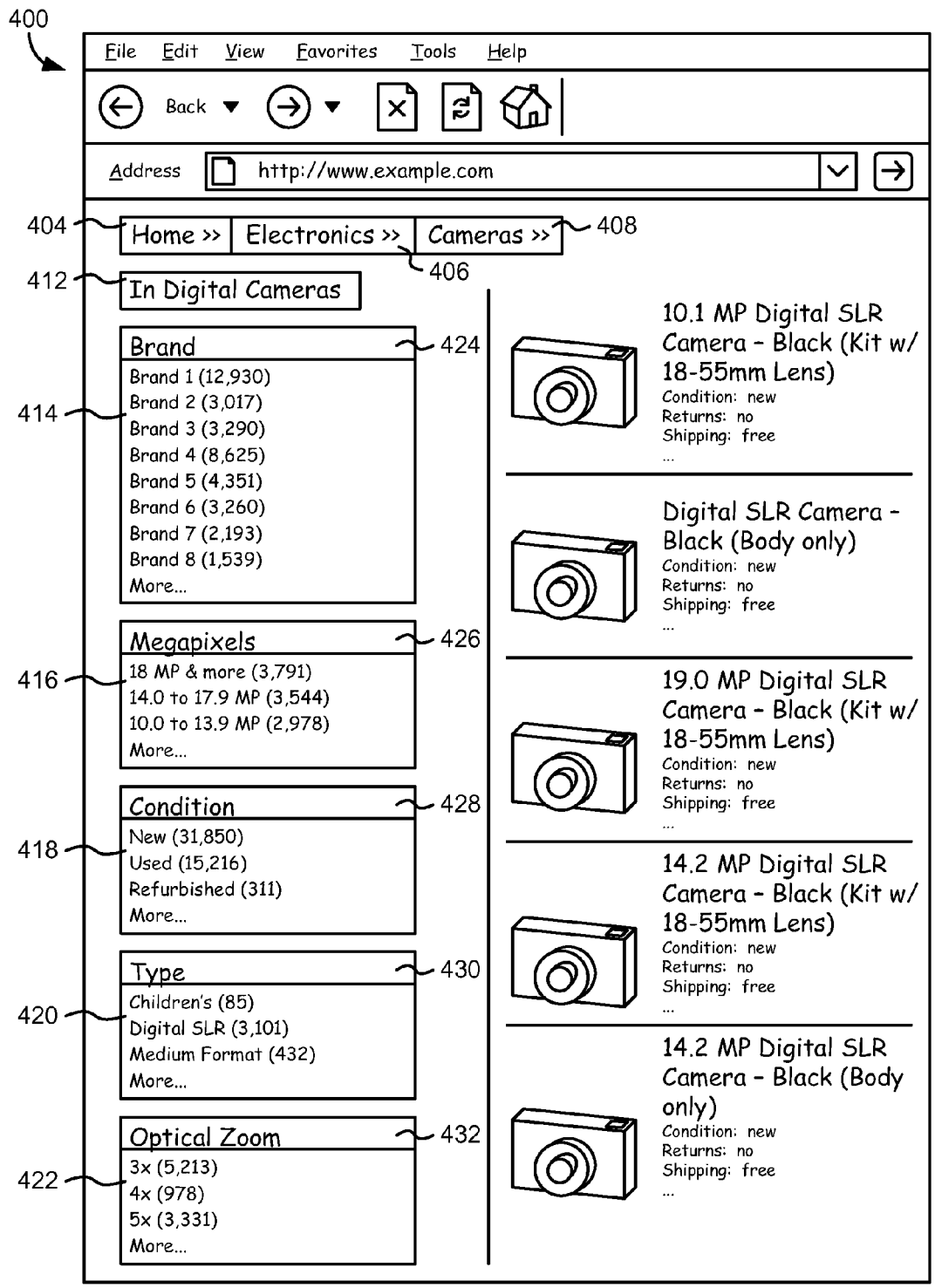
FIG. 4 is another example of a web page included in a website hierarchy according to one embodiment.

Some web pages, such as those in a higher level of the tree structure, may contain lists of products or services. One example of a web page containing lists of products is web page 400 as shown in FIG. 4. Web pages in hierarchy 200 may include one or several product lists 414, 416, 418, 420 and 422 as shown in web page 400, each product list representing a category of products and including a number of product descriptions. According to one embodiment, the product descriptions within a product list 414 may be considered to be contrarian terms within the category "brand" 424. For example, in product list 414, potential contrarian terms include "Brand 1," "Brand 2," "Brand 3," "Brand 4," etc. These terms may be considered only potential contrarian terms until the contrarian nature of the terms have been confirmed by a predetermined number of websites.

Furthermore, the product terms in product lists 414, 416, 418, 420, and 422 may only be contrarian with respect to a particular list category 424, 426, 428, 430 and 432, such that the terms are not deemed to be contrarian unless associated with that particular list category. For example, although the terms "Brand 1" and "Brand 2" may be contrarian in the context of a camera brand category 424, these terms may not be considered contrarian with respect to one another in general. Such list categories may be identified by web page computer code, such as HTML or JavaScript tags. The list category associated with such contrarian terms may be systematically determined according to process 500, described in greater detail below, by determining a description for the product list category 424, 426, 428, 430, and 432 for various product lists 414, 416, 418, 420, 422.

Referring to FIG. 5, a process 500 for mining contrarian terms and contrarian term categories from a website is shown according to one embodiment. Process 500 may be carried out by executable code stored in memory such as contrarian term detection module 132 that is executed by processing unit 184 or multiple processing units, for example. The executable code may be stored in multiple memory modules or a single memory module. According to one embodiment, the process executed by processing unit 184 may first identify websites that contain data related to products or services, at step 502. For example, identifying product or service web pages may be carried out by having the process 500 read website computer code of network accessible web pages stored at a website server 146. Website computer code may provide identifiers of product or service web pages through HTML tags, for example, at step 502. According to one embodiment, process 500 uses parsing software, such as an HTML parser to identify product HTML tags.

According to this embodiment, if step 502 determines a website does not offer a product or service, the website may be discarded and process 500 may begin again for another website. Alternatively, if step 502 determines a website offers a product or service, process 500 may move to step 504. In some cases, step 502 may be skipped altogether and process 500 may begin at step 504. According to one embodiment, process 500 uses multiple methods to identify potential contrarian terms stored within the website hierarchy 200. For example, contrarian terms stored in website computer code can be identified based on product and/or service lists, or based on distinct web pages, or leaf pages, focused on a particular product or service within a website hierarchy. According to one embodiment, steps 504, 508 and 512 identify potential contrarian terms based on leaf pages, while steps 506, 510, and 514 identify potential contrarian terms based on product and/or service lists. Although process 500 depicts these multiple methods to identify potential contrarians terms as being performed in parallel, these methods can be performed in series and in any order. Alternatively, only one of these two approaches may be used.

At step 504, process 500 interprets the computer code of a website to determine if the website hierarchy stored in memory includes any leaf pages such as leaf page 300 shown in FIG. 3 and leaf pages 220, 222, 224, 228, 230, 232, 234, 236 and 238 as shown in website hierarchy 200 in FIG. 2, for example. According to one embodiment, the process 500 identifies web pages on the lowest level 290 of hierarchy 200 such as web pages 220, 222, 224, 228, 230, 232, 234, 236 and 238. According to another embodiment, the leaf page detection process in step 504 compares a database of website uniform resource locator (URL) addresses with the website URL being analyzed in process 500. In many cases, websites will explicitly indicate leaf pages in their website URL address. For example, the website example.com explicitly identifies leaf pages as any folder in the website hierarchy contained in the folder labeled "itm," displayed as http://www.example.com/itm/ in a URL address bar of a web browser application. Accordingly, the URL for each website entering process 500 can be compared with the stored database of URL patterns to identify leaf pages of each website. According to one embodiment, at step 504, process 500 may identify web pages that are devoted to a single product and/or service regardless of hierarchy level. According to yet another embodiment, only web pages that are both on the lowest level 290 of a website hierarchy 200 and are also devoted to a single product and/or service may identified as leaf pages at step 504. Furthermore, leaf pages identified at step 504 may be used to identify list pages at step 506, as some websites organize leaf pages and list pages in predictable sequences with respect to hierarchy 200.

At step 508, once a leaf page has been identified, potential contrarian terms within the leaf page, such as leaf page 300 as shown in FIG. 3, may be extracted from the website code. For example, leaf pages such as web page 300 may also contain an identifiable description of the product or service 310. Step 508 may read the website computer code, such as computer code tags of page 300 to identify the potential contrarian term. According to one embodiment, process 500 uses parsing software to read website computer code. In addition, process 500 may implement multiple code specific parsers in various steps of process 500, such as an HTML parser and a Javascript parser, to interpret websites written in variant computer codes. According to one embodiment, each leaf page such as leaf page 220, 222 and 224 will have a contrarian term identified at step 508. For example, reading the computer code for page 220 may establish that page 220 is a product page for digital SLR cameras. Furthermore, step 506 may determine leaf page 222 contains data for an underwater camera, and leaf page 224 contains data for a children's camera. Accordingly, the terms "underwater," "children's" and "digital SLR" may be considered potential contrarian terms within the category of cameras. In addition, at step 512, a category or classification for each of the identified potential contrarian terms may be determined.

According to one embodiment, potential contrarian terms are associated with a category or class by using a bread crumb analyzer. According to one embodiment, a bread crumb analyzer reads computer code that represents a navigation path. Bread crumbs or bread crumb trails are generally displayed on websites to allow a user to keep track of their navigation path within a website. For example, in FIG. 4, elements 404, 406 and 408 constitute a bread crumb trail, or navigation path, that corresponds to website hierarchy 200 shown in FIG. 2. Likewise, in FIG. 3, elements 304, 306, 308, and 310 constitute a bread crumb trail, or navigation path, that corresponds to website hierarchy 200 shown in FIG. 2. Accordingly, at step 512 of process 500, the process may read the navigation path on web page 300 to determine that the contrarian term "digital SLR" contained in graphical interface element 310 is associated with the category of "cameras" contained in graphical interface element 308. Specifically, due to the nature of displayed navigation paths shown on website pages, step 512 may determine the second to last graphical interface element 308 in a navigation path is the category associated with the contrarian term 310, according to one embodiment.

Referring to a second method of identifying contrarian terms used by process 500, step 506 identifies list pages, such as list page 400 shown in FIG. 4 according to one embodiment. List pages may include one or several product lists 414, 416, 418, 420 and 422 each associated with a product category 424, 426, 428, 430 and 432 as shown in web page 400, for example. These list pages or category pages may be identified at step 506 by website computer code tags, a bread crumb analyzer, website navigation path or URL address database as described previously. According to one embodiment, step 506 looks for web pages that includes a list descendant category nodes, such as nodes 220, 222, and 224, which descend in hierarchy 200 from category 212. According to another embodiment, step 506 may read computer code tags that describe the formatting of descriptions as a being displayed as a list format.

According to one embodiment, the list of products and/or services may be extracted from the list page by first recognizing the data arrangement typically resulting in a list format, such as the data arrangement shown in lists 414, 416, 418, 420 and 422, for example. According to one embodiment, the data arrangement is recognized by process 500 by reading website computer code tags. For example, HTML tags will determine that list 414 will be displayed in a single column of terms and that the column will appear on the left hand side of the web page as shown in web page 400. List 414 will appear in a HTML block, for example, such that all terms within the HTML block contain relevant lists of contrarian terms. Once a list page such as list page 400 has been identified, potential contrarian terms as well as categories associated with those contrarian terms may be identified at steps 510 and 514, respectively. Additionally, step 510 may only extract lists that occur in a spatial position within a web page, such as on the left hand side of a web page, where the majority of product and/or service lists may be included. According to one embodiment, the spatial position of the product and/or service list is recognized by process 500 by reading website computer code tags. Furthermore, step 510 may only extract contrarian term lists that contain a descriptive header such as "Brand" 424, "Megapixels" 426, "Condition" 428, "Type" 430, and "optical zoom" 432 as shown in FIG. 4. According to one embodiment, the spatial position and descriptive header data can be identified by process 500 using computer code tags.

According to one embodiment, the extracted descriptions of products or services within a product list may be considered to be contrarian terms. Referring to FIG. 4, product list 414 contains a list of potential contrarian terms including "Brand 1," "Brand 2," "Brand 3," "Brand 4," etc. The terms in these product lists 414, 416, 418, 420, and 422 are only contrarian with each other when associated with a category, such as list heading "brand" 424, according to one embodiment. For example, although the terms "Brand 1" and "Brand 2" may be contrarian with respect to the category "brand" 424, these terms may not be considered contrarian in general. Accordingly, at step 514, the contrarians terms extracted from product and/or service lists 414, 416, 418, 420, and 422 may be associated with an identified category at step 514.

Referring again to process 500 as shown in FIG. 5, once potential contrarian terms are extracted from website content and are associated with an identified category according to a leaf page identification process and/or a list page identification process, process 500 may optionally process the potential contrarian terms at step 516. According to one embodiment, the potential contrarian terms may be normalized prior to being stored at step 520. For example, the terms may be stemmed, processed to eliminate stop words, or otherwise processed prior to storage. Stop words are common language articles such as "the," "of," "on," and "a" in the English language. Removing stop words can simplify software processes, simplify terms, improve the accuracy of the process, and reduce the number of contrarian terms stored. With respect to word stemming, software may accept potential contrarian term such as "boating" and output a word root such as "boat" at step 516. According to one embodiment, word roots are words without any modifiers such as plurals, prefix, suffix, affix, etc. In addition, if common words appear between a pair of contrarian terms in a common category, these common terms are eliminated, according to one embodiment.

For example, if the category is "shoes" and the extracted potential contrarian terms associated with that category include "men's shoes," and "women's shoes," the them "shoes" would be eliminated from both contrarian terms such that "men's" and "women's" would be the potential contrarian terms forwarded to step 518. Furthermore, according to one embodiment, step 516 may process the category associated with the extracted contrarian terms using a web page classifier. In this embodiment, at step 516, a web page classifier may compare the extracted categories received from steps 512 and 514 to a uniform category or classification structure stored in memory. Because each individual website uses their own category structure and category terms, the identified category structure can be converted into the uniform structure stored in memory. The uniform category or classification structure may be stored in a server associated with an entity providing keywords to advertisers. The categories extracted from a web page may be compared with terms in the uniform category structure to determine which uniform category the extracted contrarian terms should be associated with. According to one embodiment, the extracted category is compared with all terms in the uniform category structure and the comparison that results in the highest average weighted result according to a software algorithm is selected as the correct uniform category. For example, if "shoes" is identified as a category at step 514, "shoes" may be classified under the uniform category term "footwear" rather than "shoes." The software algorithm may take several factors into account such as similarity of characters in the web page category and uniform category or contextual information included on the web page analyzed in process 500.

At step 518, the potential contrarian terms may be confirmed as contrarian terms. According to one embodiment, process 500 compares contrarian terms extracted from the website currently undergoing process 500 with terms extracted from previously reviewed websites at step 518. If the extracted and/or processed term matches with a previously stored term in a common category, the contrarian term may be confirmed as a contrarian term. Terms need not necessarily match characters exactly for a match to be determined. For example, two terms may be considered matching if a predetermined number or percentage of characters are in common. According to another embodiment, the potential contrarian term is confirmed at step 518 if it is matched with a predetermined number of previously stored terms in a common category. In some cases, step 518 may be skipped, or processed terms may be deemed to be contrarian if there is insufficient prior data with which to compare the processed terms.

Once the contrarian terms are confirmed at step 518, at step 520, the terms and associated category may be stored in the memory of a computing device, such as contrarian term library 134 of server 126 (FIG. 1). The contrarian term library 134 may be used to compare previously stored contrarian terms with newly extracted potential contrarian terms at step 518. Once the contrarian terms have been stored in association with a category at step 520, the resulting database may be used to provide data to a user in a graphical user interface. For example, the database of contrarian terms associated with a category may be used to provide keyword suggestions to advertisers desiring to bid on keywords from a content platform, for example.

FIG. 6 provides one example of a graphical user interface 600, which may be a web page, that transmits and receives contrarian term data from a contrarian term library stored in memory 134, for example. Web page 600 may be a web page in a website associated with a content platform 198 that offers content associated with search engine results. The website may be stored in the memory 182 of a server 140 or 146, for example. Graphical user interface 600 may be viewed on display 150 of a network connected device such as client device 102, for example. Client devices 102 may include a processing circuit 160, a memory 170, a network interface 140, a user input element 106 as well as a display 150, according to one embodiment. Client device 102 may be used to view a webpage 108 stored on web server 126, 140 or 146, using a software browser application 106. According to one embodiment, a user such as an advertiser may use graphical user interface 600 to select keywords they would like to bid on.

According to one embodiment, graphical user interface 600 is an interface for a keyword tool program. Using the keyword tool program, a user can receive keyword suggestions by entering the product or service they would like to advertise into graphical element 604 and the category of the product or service into graphical element 602. This input data can be used to retrieve suggested keywords at graphical element 606. According to one embodiment, graphical user interface 600 accesses the contrarian term data and associated category data stored in memory, such as contrarian term library 134, to provide the suggested keywords in graphical element 606. According to one embodiment, the order of the keyword suggestion list in element 606 is determined by the degree of similarity between the terms entered into graphical elements 604 and 602 and the contrarian terms and associated category stored in contrarian term library 134. For example, if process 500 has determined that the terms "men's" and "women's" are contrarian terms with respect to the category "shoes" and a user, such as an advertiser, enters the phrase "men's shoes" in graphical element 604 and the category "shoes" in graphical element 602, the keyword term "women's shoes" will be demoted to a lower position in the keyword suggestion list 606. According to one embodiment, web page and graphical user interface 600 may also be used by an advertiser to access contrarian term library 134 to provide a group suggestion for a series of contrarian terms such as "Men's," "Women's." For example, a user may submit a request into a graphical user interface element for the grouping associated with "Women's." Web page 600 may then connect to contrarian term library 134 and retrieve and display a broader group such as "gender" to the user. Furthermore, according to one embodiment, web page 600 may allow a user such as an advertiser to purchase or bid on keyword combinations that include an entire group of contrarian terms. For example, web page 600 may provide a list of keyword suggestions 606 that includes "gender" shoes in addition to men's shoes and women's shows, according to one embodiment.

Referring again to FIG. 1, elements 126, 140, 144, and 198 may be computing devices having a processor and a memory. The processing circuit may include digital and/or analog electrical components (e.g., a microprocessor, application-specific integrated circuit, microcontroller, or other digital logic) configured to perform the functions described herein. The processing circuit may be a single server computer or a plurality of server computers, and may operate in a cloud computing environment, such as a shared, scalable computing environment. The memory includes storage media, which may be volatile or non-volatile memory that includes, for example, read only memory (ROM), random access memory (RAM), magnetic disk storage media, optical storage media, flash memory devices and zip drives. The memory may store data files associated with particular websites in a database format.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus, such as a processing circuit. A processing circuit such as CPU 184 may include any digital and/or analog circuit components configured to perform the functions described herein, such as a microprocessor, microcontroller, application-specific integrated circuit, programmable logic, etc. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Furthermore, the computer readable storage medium does not include a signal.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method of identifying contrarian terms comprising:
receiving, using one or more data processors, data for a plurality of websites;
determining, using one or more data processors, a set of websites from the plurality of websites that describe one or more products or services based on one or more tags associated with each of the set of websites;

extracting, for each of the set of websites by one or more data processors, a set of contrarian terms, wherein extracting the set of contrarian terms comprises:
  extracting a first term and a second term from a website of the set of websites;
  identifying a category for the first term based on analyzed content for the website of the set of websites;
  identifying the category for the second term based on analyzed content for the website of the set of websites;
  determining the first term and the second term are contrarian terms for the set of contrarian terms based on the category and a first description of a product or service associated with the first term and a second description of a product or service associated with the second term; and
storing the set of contrarian terms and the identified category in a memory.

2. The method of claim 1, wherein identifying the category the first term comprises:
  determining, using one or more data processors, a navigation path associated with a web page for a product or service associated with the first term for the website of the set of websites, and
  identifying, using one or more data processors, the category for the first term based on a prior element of the determined navigation path.

3. The method of claim 1 further comprising:
  analyzing, using one or more data processors, content of each of the set of websites by identifying a website organizational structure of each of the set of websites, the website organizational structure comprising data representing a plurality of web pages of each website and data representing relationships of each web page of the plurality of web pages to one or more other web pages of the plurality of web pages.

4. The method of claim 3, wherein identifying a website organizational structure comprises identification of a plurality of leaf web pages or identification of a list web page.

5. The method of claim 4, wherein an identified leaf web page includes a description of a product or service, wherein extracting a contrarian term of the set of contrarian terms is based on the description of the product or service of the leaf web page.

6. The method of claim 4, wherein an identified list web page comprises a product list associated with a product category, wherein extracting a contrarian term of the set of contrarian terms is based on the product list of the identified list web page.

7. The method of claim 6, wherein identifying the category for the extracted contrarian term based on the product list is based on the associated product category.

8. The method of claim 1, further comprising:
  normalizing, using one or more data processors, each extracted contrarian term of the set of contrarian terms by word stemming or eliminating stop words.

9. The method of claim 1, further comprising:
  comparing, using one or more data processors, a similarity of an identified category for each contrarian term of the set of contrarian terms to a uniform category structure.

10. The method of claim 1, further comprising:
  generating, using one or more data processors, display data representing a list of suggested keywords, wherein the order of the displayed list of suggested keywords is based on the set of contrarian terms and identified categories for the set of contrarian terms.

11. The method of claim 10, wherein the list of suggested keywords are generated in response to a user entering a keyword into a graphical user interface.

12. A system for serving content items comprising:
  one or more data processors; and one or more storage devices storing instructions that, when executed by the one or more data processors, cause the one or more data processors to perform operations comprising:
    identifying a plurality of leaf web pages of a website or a list web page of a website,
    extracting a set of contrarian terms from the plurality of identified leaf web pages or the identified list web page, wherein extracting the set of contrarian terms comprises:
      extracting a first term and a second term from the plurality of identified leaf web pages or the identified list web page;
      identifying a category for the first term based on analyzed content for the plurality of identified leaf web pages or the identified list web page;
      identifying the category for the second term based on analyzed content for the website of the set of websites; and
      determining the first term and the second term are contrarian terms for the set of contrarian terms based on the category and a first description of a product or service associated with the first term and a second description of a product or service associated with the second term; and
    storing the set of contrarian terms and the category in a memory.

13. The system of claim 12, wherein identifying the plurality of leaf web pages or the list web page is based on parsing one or more tags associated with the website.

14. The system of claim 12, wherein identifying the category for the first term is based on a common parent web page of the plurality of leaf web pages.

15. The system of claim 12, wherein identifying the category for the first term comprises:
  determining a navigation path associated with a web page for a product or service associated with the first term, and
  identifying the category for the first term based on a prior element of the determined navigation path.

16. The system of claim 12, wherein the identified list web page comprises a product list and a product category, wherein extracting the set of contrarian terms is based on the product list, and wherein identifying the category for first term is based on the product category.

17. The system of claim 12, wherein the one or more storage devices store instructions that cause the one or more data processors to perform operations further comprising:
  generating display data representing a list of suggested keywords, wherein the order of the displayed list of suggested keywords is based on the set of contrarian terms and the identified category.

18. A computer readable storage device storing instructions that, when executed by one or more data processors, cause the one or more data processors to perform operations comprising:
  identifying a plurality of leaf web pages of a website or a list web page of a website;
  extracting a set of contrarian terms from the plurality of identified leaf web pages or the identified list web page, wherein extracting the set of contrarian terms comprises:

extracting a first term and a second term from the plurality of identified leaf web pages or the identified list web page;

identifying a category for the first term based on analyzed content for the plurality of identified leaf web pages or the identified list web page;

identifying the category for the second term based on analyzed content for the website of the set of websites; and determining the first term and the second term are contrarian terms for the set of contrarian terms based on the category and a first description of a product or service associated with the first term and a second description of a product or service associated with the second term; and storing the first and second set of contrarian terms and the identified category in a memory.

* * * * *